(No Model.)
E. L. TRUBA.
BALL BEARING.
No. 606,040. Patented June 21, 1898.
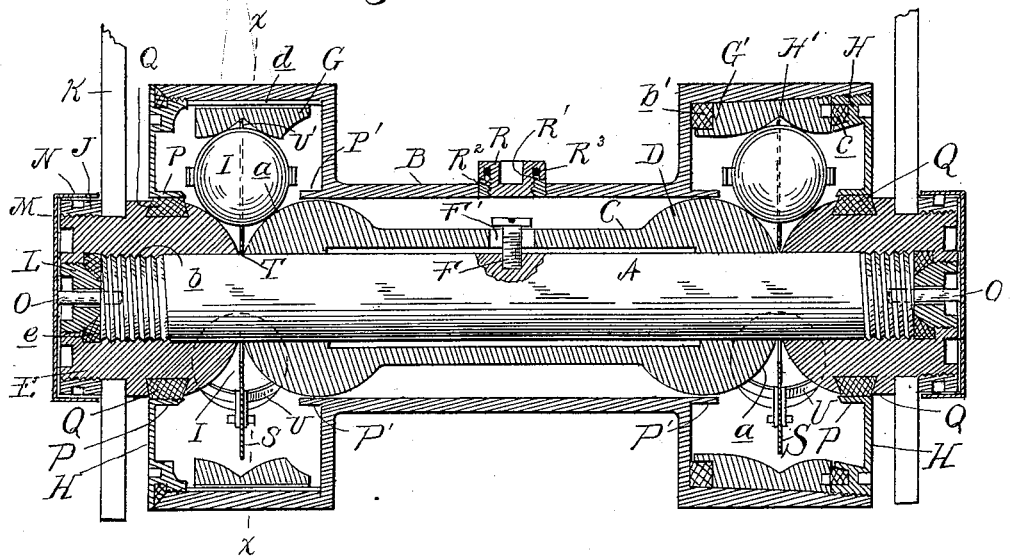
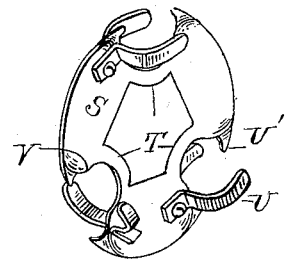
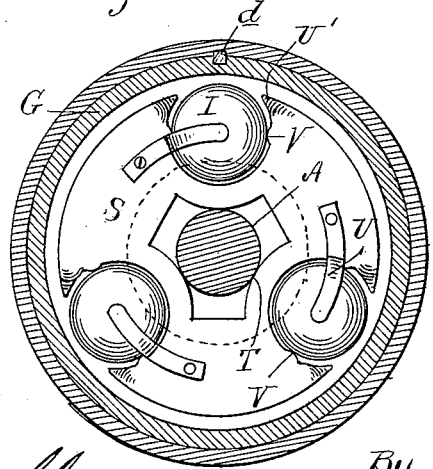
Inventor
Edward L. Truba

UNITED STATES PATENT OFFICE.

EDWARD L. TRUBA, OF DETROIT, MICHIGAN.

BALL-BEARING.

SPECIFICATION forming part of Letters Patent No. 606,040, dated June 21, 1898.

Application filed July 6, 1897. Serial No. 643,606. (No model.)

*To all whom it may concern:*

Be it known that I, EDWARD L. TRUBA, a citizen of the United States, residing at Detroit, in the county of Wayne and State of Michigan, have invented certain new and useful Improvements in Ball-Bearings, of which the following is a specification, reference being had therein to the accompanying drawings.

The invention relates to the construction of a ball-bearing, and particularly to that type of ball-bearing in which there are a minimum number of balls held at specified distances apart at all times by a spacing plate or disk.

The invention consists in the construction of the bearing proper of that type known as a "four-pointed" bearing and in the means of adjusting and securing the bearing faces or cones and in the dust-proof and oil-proof features and the locking means for the various parts and in the arrangement, construction, and combination of the various parts, all as more fully hereinafter described, and particularly set forth in the claims.

In the drawings, Figure 1 is a section through the hub of a rear wheel of a safety-bicycle embodying my invention. Fig. 2 is a cross-section thereof on line $x$ $x$. Fig. 3 is a detached perspective view of the spacing and ball-retaining plate or disk.

A is a shaft or axle.

B is the hub or casing. In this construction I have shown the hub; but it is evident without further illustration or description that the same construction of bearing, &c., may be applied to the crank-shaft or any part of a bicycle, if desired. On the shaft is a sleeve C, having the enlargements D on each end, with the inclined faces $a$, which form one side of the inner ball-race for each set of balls.

E are the outer cones, which are provided with suitable screw-threads to engage with corresponding threads on the ends of the shaft, as shown at $b$. These cones have correspondingly-inclined faces opposite the incline to the faces $a$ on the sleeve C, and the two form in effect a two-pointed inner bearing for the balls on the shaft.

The sleeve C is held from rotation on the shaft by any suitable means. I have shown a screw F, entering in a slot F' in the sleeve and screwed into the shaft or axle, so that the sleeve may have an endwise movement on the axle, but cannot rotate thereon.

In the casing or hub B at the ends are the rings G and G'. One of these rings is free to have a sliding movement in relation to the sleeve C, while the other is fixed in relation thereto. I have shown the ring G' as fixed and held in position against endwise movement by means of the thread on the ring G' and the dust-ring H, engaging in the screw-thread in one end of the hub and contacting the outer face of the ring G'. A similar or substantially similar dust-ring is provided at the other end of the bearing.

$b'$ and $c$ are packing-rings at opposite ends of the ring G', and in this case I have shown the packing-ring $c$ as formed in a groove in the dust-ring H. The ring G is provided with a keyway or a key, engaging with the key or keyway $d$ on the hub, so that it may be moved toward or from the ring G'. Both these rings are provided with corresponding grooved bearing-faces H', the balls I being between these latter and the cones on the shaft previously described and contacting at four points, as plainly shown at Fig. 1, so as to make a four-pointed bearing.

To take up the wear or to adjust the bearing, the cones E may be adjusted in or out, and by having the sleeve C and the ring G slidingly secured this adjustment will center the bearing in relation to the balls. I prefer, however, to adjust the ends separately. The cones E, I preferably lock in position, first, by means of ring-shaped nuts J, engaging in exterior screw-threads on the cones and which jam against the frame K of the bicycle, and, second, by nuts L, which engage interior screw-threads in the cones and jam against the ends of the shaft. Between these last nuts and the shaft I place the packing-rings $e$ in the spaces formed by grooves in the cones and bevels on the inner faces of the nuts L. These bevel-faces compress the packing-rings so that it is impossible for oil to leak through them.

In order to make the device absolutely dust-proof, I secure over each end of the entire axle and the cones a dust-cap M, having a marginal flange N, this dust-cap being of light sheet metal and having secured to and extending from its center a screw-pin O, which passes through a central aperture in the nut L and engages a screw-threaded hole in the end of the shaft for securing the cap in place.

The dust-rings H extend down in close proximity to the cones E and are each preferably provided with an inwardly-extending flange P, which rides in close contact with the washer Q, fitting in a groove in the cone so as to make a dust and oil proof joint at that point. The hub B has at each end opposite the flange P a similar flange B', these flanges serving to retain the oil in the ball-races.

R is a screw-cap fitting in an aperture in the hub B, provided with a grooved flange which fits over a corresponding flange R' on bushing R$^2$, which is secured in the aperture in the hub, as shown in Fig. 1. This cap has a packing-ring R$^3$ in a groove in its under face, which bears against the flange R' and, being compressed, forms an oil-proof and dust-proof joint. This cap is in line with a screw F, so that the screw may be fastened through the hole when the cap is removed.

In the construction which I have shown three balls are employed for each ball-race, these balls being equidistant from each other and running in the ball-race described.

Sleeved on the shaft A and between the bearing-faces of the inner cones is a spacing plate or disk S, cut away at the three points where the balls are located, as shown in Figs. 2 and 3. This disk is provided with three convex bearing-faces T, which are the only points of contact on the shaft, thereby reducing the friction of the disk in turning thereon. Secured to the disk are the yokes U, which embrace the sides of the balls and keep the disk in its upward position. This disk acts also as a ball-retainer by having the points U' project over the edges of the balls, as shown in connection with the yokes U, so that by taking out the disk the balls will be held therein until one arm of the yoke is moved to permit the removal of the ball. To reduce the friction, I also form convex faces V in the cut-away portions or recesses in the disk, so that the balls only contact on these convex portions. All the contacting faces of the disk are sharpened to a knife-edge and preferably hardened.

The balls are maintained in proper relation to each other by means of the spacing-disk, which has but very little friction either on the balls or the shaft with the construction described, and my experience is that a three-ball ball-bearing of this kind will run with a minimum friction.

What I claim is—

1. In a ball-bearing, the combination of the axle, a sleeve thereon having at opposite ends oppositely-inclined ends or heads, complementary cones for each end adjustably secured in relation thereto, the sleeve being secured against rotation, but free to have a limited endwise movement, outer ball-races and the balls.

2. In a ball-bearing, the combination with the axle and its inclosing casing or hub, of inner ball-races formed by an endwise-movable sleeve such as C having opposite inclines at the ends, cones adjustable to and from these inclines on the sleeve, rings in the hub or casing opposite the inclines and cones and each having a groove to form an outer double oppositely-inclined bearing-face for the balls, one of these rings having an endwise movement, and the balls between the bearing-faces having four points of contact therewith, substantially as described.

3. In a ball-bearing, the combination with the casing or hub, and ball-races and balls therein, of washers such as Q carried by and moving with the shaft, the dust-rings H secured to the casing or hub and having their inner faces in close proximity to the washers Q, substantially as described.

4. In a ball-bearing, the combination with the shaft and the casing or hub, of the ways, the balls therein, the dust-rings H adapted to close the spaces between the casing and the shaft and having the inwardly-extending flanges P, and the washers Q on the inner members of the ways with which said flanges are in close proximity, substantially as described.

5. In a ball-bearing, the combination with the shaft and the casing or hub, of the sleeve C on the shaft having the end bearing-surfaces, the cones E secured to the ends of the shaft and having exterior grooves, the washers Q in these grooves, the dust-rings H secured to the casing or hub and having the flanges P approximately contacting the washers, the balls, and outer bearing-surfaces for the balls, substantially as described.

6. In a ball-bearing, the combination of the axle having an inner bearing-surface for the balls, the casing or hub having an outer bearing-surface therefor, balls between said surfaces, the dust-rings H each having the inwardly-projecting flange P, and the flanges P' on the hub or casing B opposite the flanges P for the purpose described.

7. The combination with a vehicle-frame, of a ball-bearing comprising a shaft, the balls, their ways including the outer cones E, each having an outwardly-extending end embraced by the frame, and clamping-nuts J screw-threaded onto the outer ends of the cones securing the bearing to the frame of the vehicle and locking the cones in position, substantially as described.

8. In a ball-bearing, the combination with the shaft, the hub, the balls, and their ways including the outer cones E projecting beyond the ends of the shaft and interiorly screw-threaded, of the nuts L engaging in these interior screw-threads and packing material adapted to be compressed by said nuts, substantially as and for the purpose described.

9. In a ball-bearing, the combination with the shaft, the way including outer cones interiorly screw-threaded, the balls, the centrally-apertured nuts L engaging such interior screw-threads and contacting the ends of the shaft, the dust-caps M having overhanging flanges, and the screws O engaging the screw-threads in the ends of the shaft and passing through the apertures in the nuts L, substantially as described.

10. In a ball-bearing, the combination, with the shaft, the hub, the balls, the ways including interiorly-screw-threaded end cones being adjustable on the shaft and projecting beyond the ends of the same, of the nuts L engaging with the screw-threads and contacting the ends of the shaft and having their inner faces beveled, and packing-rings compressed by such beveled faces against the cones and the ends of the shaft, substantially as described.

11. In a ball-bearing, the combination with the shaft, the hub or casing, the balls, and their ball-races, of a spacing-disk having open-sided recesses or notches for the balls, arms or yokes carried by the disk adapted to have side contact with the balls and overhanging bearing portions such as U' on the disk whereby the disk acts as a ball-retainer, substantially as described.

12. In a ball-bearing, the combination with the shaft, the hub or casing, the ball-races and the balls therein, of a spacing-disk recessed to receive the balls and being supported on the shaft or inner bearing-surface, yokes on the disk having side contact with the balls and the convex projections V in the recesses of the disk for the purpose described.

13. In a ball-bearing, the combination of the hub or casing, the shaft, the endwise-movable sleeve C having a slot therein, the screw F engaging said slot in the sleeve to permit the endwise movement but to prevent rotation, the hub or casing having an aperture opposite said slot, the bushing in the aperture interiorly screw-threaded, the cap R fitting in the bushing and the packing-ring $R^3$ fitting in a groove in the under side of the cap, substantially as described.

In testimony whereof I affix my signature in presence of two witnesses.

EDWARD L. TRUBA.

Witnesses:
M. B. O'DOGHERTY,
OTTO F. BARTHEL.